April 11, 1939.  A. MATSUBARA  2,153,636
METHOD OF PROSPECTING UNDERGROUND ORE BODIES
Filed Nov. 22, 1934
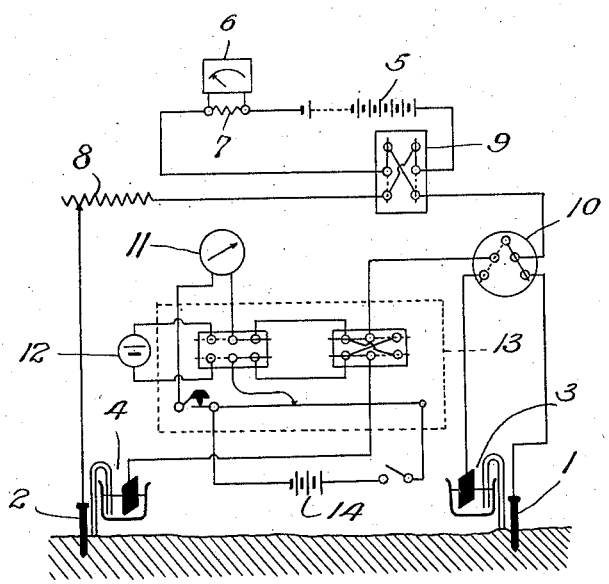
Inventor,
ATSUSHI MATSUBARA
By: Richards & Geier
Attorneys, Patented Apr. 11, 1939

2,153,636

UNITED STATES PATENT OFFICE 2,153,636

METHOD OF PROSPECTING UNDERGROUND ORE BODIES

Atsushi Matsubara, Kamikyo-ku, Kyoto, Japan

Application November 22, 1934, Serial No. 754,249
In Japan November 30, 1933

3 Claims. (Cl. 175—182)

My present invention relates to the method of prospecting underground ore body by detecting its form and position from the ground surface by drawing a map showing difference of the back potential arising from the difference of the earthed position of an electrode, through which a constant direct electric current is transmitted into the earth so as to polarise the opposite surface of the ore body electrolytically, taking advantage of the fact that the anode or cathode potential varies according to the current density when the ground water, which is in contact with the ore, is electrolysed by a flow of direct current.

A particular object of the present invention is to provide a novel method of prospecting by means of simple measurements of potential value which varies in such a large range that the differences among them are far larger than the error of measurement.

In this invention, a direct current is transmitted through two electrodes earthed on the ground surface, one of which is sometimes substituted by a partly known ore body itself. In case when the two transmitting electrodes are used, one of them is earthed at a fixed point of the ground surface preferably far distant from the searched district. This will be subsequently called "the fixed, transmitting electrode" or "electrode 1". The other transmitting electrode is earthed at various different points on the searched district in turn in order to polarise various different portions of the surface of searched ore body in turn, the latter serving as the anti-electrode. This will be subsequently called "the transportable, transmitting electrode" or "electrode 2".

In case when an ore body itself is used as one of the transmitting electrodes, the transmitting cable is directly connected to a dried portion of a partly known ore body, for instance, an undecomposed portion of out crop, a portion of compact ore body exposed on the wall of an adit, etc., the ore body itself serving, in this case, as the fixed, transmitting electrode. The other transmitting electrode is the same as in the above case.

When the two transmitting electrodes are used, two non-polarisable electrodes are employed for the potential-measurement, each of which is earthed in the vicinity of one of the transmitting electrodes so that the one is earthed at the distant, fixed point and the other is transported wherever on the ground of the searched district together with the electrode 2. The fixed non-polarisable electrode will be subsequently called "the electrode 3" and the transported, non-polarisable one "the electrode 4". In case when an ore body itself serves as the fixed, transmitting electrode, it also takes part of the electrode 3.

The measurement of potential difference between the electrodes 3 and 4 or that between the electrode 4 and the transmitting ore body is accomplished by means of special rotating interruptors.

This measurement is made when the circuit of the transmitted current is interrupted. Sometimes the electrode 4 is earthed at various points around the electrode 2, and from these measurements the proper value of the back potential, which would appear if the electrode 4 were earthed at the same point as the electrode 2, may be computed.

The present invention will be better understood by the following detailed description by reference to the accompanying drawing, which shows the connection diagram in the case when the two transmitting electrodes are used.

In the drawing attached hereto, 1 shows the fixed, transmitting electrode and 2 the transported, transmitting electrode. As these electrodes, metal rods of appropriate length may be employed. 3 and 4 show the electrode 3 and the electrode 4 respectively. These are non-polarisable electrodes such as copper wire gauze dipped in saturated solution of copper sulphate which is slightly acidified by sulphuric acid. 5 shows an electric source of the polarising current; 6 ammeter; 8 resistance; 9 switch; 10 an interruptor of rotating type. By means of this interruptor, the current circuit may be kept open while the potential circuit is left in the closed state for a short length of time, after which the latter is opened and the former is closed and again they may be left standing in that state for another short length of time. This alternate opening and closing of each circuit may be repeated with a constant frequency which is greater than about ten times per second.

In the drawing attached hereto, 11 shows a galvanometer used as a zero-indicator; 12 a standard cell; 13 a potentiometer of compensation type and 14 a working battery used in the potentiometry.

In case when no ore body exists under the ground between the two electrodes 1 and 2, there appears, at the instant when the transmitted current is cut off, no noticeable potential difference between the electrodes 3 and 4 if the latters are so constructed that their single potentials are practically equal to each other. However, in case when an ore body actually exists there, more or less distinct potential difference between the electrodes 3 and 4 will be observed.

Since the intensity of back potential increases with increase of current density, and since the former remains practically constant at the anti-electrode of the electrode 1, the relative height of the observed potential is mainly controlled by the current density at that portion of the surface of ore body which acts as the anti-electrode of the electrode 2. Therefore, the observed potential value will be larger when the earthed point of 2 is situated nearer to the ore body than otherwise. If the earthed point of 2 approaches nearer and nearer to the point right over the ore body and passes across it, the measured potential will assume a maximum value at that point.

When a conducting ore body actually exists between the two transmitting electrodes, one end of the ore body is polarized anodically while the other is polarized cathodically. If, for instance, the direction of the flow of transmitted current is so chosen that the anodically polarized end acts as the anti-electrode to the electrode 3 and the cathodically polarized end to the electrode 4 in the potentiometry, the latter electrode will be always more positive than the former.

Let the distance of electrode 4 from the cathodically polarized end be A, that from anodically polarized end be B, that of the electrode 3 from the cathodically polarized end be C, and that of the same electrode from anodically polarized end be D. Then $$V=\frac{\rho I}{2\pi}\left(\frac{1}{A}-\frac{1}{B}-\frac{1}{C}+\frac{1}{D}\right)$$

where V is the observed potential difference, I is the total reverse current, and $\rho$ is the resistivity of the earth. The electromotive force which tends to produce a current flowing from the electrode 3 to 4 through the earth is taken as positive.

By properly choosing the earth places of the fixed electrodes, $$\frac{1}{C} \text{ and } \frac{1}{D}$$

may be kept negligibly small as compared with $$\frac{1}{A}$$

and in many cases $$\frac{1}{B}$$

may also be kept very small for the lowest or farthest portion of the ore body or of another ore body from the field-electrodes may be made to act as the anti-electrode to the fixed electrodes. Even when $$\frac{1}{B}$$

is not negligibly small, it may remain practically constant during the prospecting of a certain limited area of the searched district. By a proper arrangement of the fixed electrodes, therefore, it is principally A that determines the local variation of V.

Since I increases with increase of the reverse electromotive force, and the latter in turn increases with increase of the current density in the electrolysis, and since the current density undergoes a considerable increase with the decrease of the distance of electrode 2 from the ore body, I may become larger and larger as the electrode 2 approaches nearer and nearer to the ore body. If the distance A is maintained practically equal to the distance of electrode 2 from the ore body, the increase of V must show the approach of the latter electrode to the ore body.

In practice, the electrode 4 should not be earthed at the same point on the ground as the transmitting electrode 2, for a certain amount of capillary potential is produced just around the latter as the result of so-called electrostenolysis and that will render the measured value of V often meaningless. So the two electrodes should be more or less separated from each other.

The necessary separation of the two electrodes 2 and 4, which can be determined by some blank test sending direct current through the superficial portion of the earth, differs according to the nature of rock and soil: in porous hygroscopic ground, such as deep soil, tuffs, or drifts, etc., only a very small separation is sufficient to avoid the above disturbance; in some fresh rocks such as crystalline schist, however, the disturbance reaches often to an appreciable distance.

In the latter case, it is often impossible to keep the distance A equal to that of electrode 2 from the ore body unless the latter is not located very deep. So it is necessary to find the proper value of V indirectly. This can be accomplished by getting four values of V earthing the electrode 4 at four different places, the proper value of V being found by calculation. This calculation gives also the locality of the polarized point of ore body numerically.

In the present method of prospecting, many earthing points scattering over the whole area of the searched district are arranged, and, during the transmission of the intermittent direct current of a definite average intensity, the potentiometry is made by the aid of a rotating interrupter when the transported electrode 2 is earthed at each of these points and the electrode 4 is earthed in its vicinity. Finally the measured potential values are noted down on the proper positions on a map showing the earthing points and equi-potential curves are drawn on the map. These curves reveal the position and the shape of the searched ore body in the same manner as the isobathymetric curves reveal the position and the shape of a submarine relief.

This invention can be applied in searching for all those minerals which are susceptible of metallic conduction especially for sulphide minerals such as iron pyrite, copper pyrite, galena, argentite, etc., and some oxide minerals such as magnetite or pyrolusite.

Though the measured quantity in the present method of prospecting is the back potential as in one of the potential methods of C. Schlumberger's, in accordance with the applicant's method the position of the movable electrode is shifted at each reading and a single value noted at each position. During the actual operation of the present method, the latter changes from time to time in accordance with the change of the earthed point of the electrode 2.

Having now particularly described and ascertained the nature of this invention and in what manner the same is to be performed, I declare that what I claim is as follows:—

1. The method of prospecting underground ore bodies comprising the steps of comparing the back potentials due to the presence of an ore body at different points in the area under investigation by polarising the ore body with an intermittent direct current of a constant intensity flowing through a transportable electrode earthed at various different points on the ground surface in turn and a fixed electrode, and measuring the potential difference between two non-polarisable electrodes, one of which is earthed in the vicinity of the point at which the transmitting, transportable electrode is earthed.

2. The method of prospecting underground ore bodies comprising the steps of comparing the back potentials due to the presence of an ore body at different points in the area under investigation by polarising the ore body with an intermittent direct current of a constant intensity flowing through a transportable electrode earthed at various different points on the ground surface in turn and a fixed electrode, which is an electrode earthed on a remote ground, and measuring the potential difference between two non-polarisable electrodes, one of which is earthed in the vicinity of the point at which the transmitting, transportable electrode is earthed.

3. The method of prospecting underground ore bodies comprising the steps of comparing the back potentials due to the presence of an ore body at different points in the area under investigation by polarising the ore body with an intermittent direct current of a constant intensity flowing through a transportable electrode earthed at various different points on the ground surface in turn and a fixed electrode, and measuring the potential difference between two non-polarisable electrodes, one of which is earthed in the vicinity of the point at which the transmitting, transportable electrode is earthed, the other non-polarisable electrode being an electrode earthed in the vicinity of the same point at which the fixed transmitting electrode is earthed.

ATSUSHI MATSUBARA.